United States Patent [19]
Pollman et al.

[11] Patent Number: 5,808,848
[45] Date of Patent: Sep. 15, 1998

[54] DIGITAL CIRCUIT INTERRUPTER SHUNT TRIP ACCESSORY MODULE

[75] Inventors: John A. Pollman, Seymour; Raymond K. Seymour, Plainville, both of Conn.

[73] Assignee: General Electric Company, New York, N.Y.

[21] Appl. No.: 804,047

[22] Filed: Feb. 21, 1997

[51] Int. Cl.⁶ .................................................. H02H 3/00
[52] U.S. Cl. ............................................. 361/93; 361/54
[58] Field of Search ............................... 361/93, 94, 95, 361/96, 98, 100, 101, 54, 56, 57

[56] References Cited

U.S. PATENT DOCUMENTS

| | | | |
|---|---|---|---|
| 4,672,501 | 6/1987 | Bilac et al. | 361/96 |
| 4,833,563 | 5/1989 | Russell | 361/92 |
| 4,870,531 | 9/1989 | Danek | 361/93 |
| 5,539,605 | 7/1996 | Pollman et al. | 361/92 |
| 5,546,265 | 8/1996 | Santos et al. | 361/93 |

OTHER PUBLICATIONS

R.K. Seymour, et al., Circuit Breaker Contact Position Indicating Unit, Filed 3 Feb. 1997 S.N. 08/794,108.

*Primary Examiner*—Sally C. Medley
*Attorney, Agent, or Firm*—Richard A. Menelly; Carl B. Horton

[57] ABSTRACT

An integrated circuit breaker is provided with shunt trip capability along with automatic overcurrent protection through the circuit breaker trip unit and shunt trip module. The shunt trip module further provides auxiliary power to the trip unit and allows the trip unit microprocessor to report and record the shunt trip operation. The trip unit communicates with the circuit breaker operating mechanism to determine the ON-OFF status of the circuit breaker contacts.

2 Claims, 3 Drawing Sheets

DIGITAL CIRCUIT INTERRUPTER SHUNT TRIP ACCESSORY MODULE

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

U.S. Pat. No. 4,833,563 entitled "Molded Case Circuit Breaker Actuator-Accessory Module" describes an integrated protection unit that includes basic overcurrent protection facility along with selective electrical accessories. A specific actuator-accessory module is selected to give the required accessory function along with basic overcurrent protection. This patent describes transmission of a separate shunt trip signal directly to the actuator-accessory module without connection to the circuit breaker trip unit circuit.

U.S. Pat. No. 5,539,605 entitled "Digital Circuit Interrupter Undervoltage Release Accessory" describes an independent undervoltage release module that provides auxiliary power to the circuit breaker trip unit to enable the trip unit microprocessor and to allow the microprocessor to report, display and record the undervoltage release information.

U.S. patent application Ser. No. 08/614,084 filed Mar. 12, 1996 entitled "Modular Accessory Mechanical Lock-Out Mechanism" discloses a lockout solenoid arrangement that prevents an associated circuit breaker operating mechanism from closing until and unless the accessories have become reset. U.S. patent application Ser. No. 08/585,652 filed Jan. 16, 1996 entitled "Digital Circuit Interrupter Shunt Trip Accessory Module" discloses an integrated circuit breaker having shunt trip capability along with automatic overcurrent protection. An independent shunt trip module provides a shunt trip signal to the circuit breaker trip unit to actuate the trip unit flux shifter unit to interrupt separate the circuit breaker contacts and interrupt circuit current. The shunt trip module further supplies auxiliary power to the trip unit to allow the trip unit microprocessor to report and record the shunt trip operation. The shunt trip signal is applied to the circuit breaker trip unit by an operator from a separate voltage source inputted to the shunt trip module and thence to the circuit breaker trip unit. To prevent the trip unit flux shifter solenoid from overheating, a cut-off switch indicates to the trip unit to remove operating power from the flux shifter. If the shunt trip is still energized and the circuit breaker contacts are later energized, the flux shifter responds to again initiate contact separation, which could stress the circuit breaker contacts as well as the circuit breaker operating mechanism components.

The subject invention proposes a shunt trip with lockout module that interacts with the circuit breaker trip unit to provide shunt trip circuit interruption as well as to energize an internal shunt trip lockout solenoid which interacts with the circuit breaker mechanism to prevent unintentional reclosure of the circuit breaker contacts. The energized shunt trip will also continue to supply operating power to the trip unit to allow the trip unit to communicate and display the shunt trip operation.

SUMMARY OF THE INVENTION

An integrated circuit breaker is described having shunt trip capability along with automatic overcurrent protection. An independent shunt trip module supplies a signal to the circuit breaker trip unit to interrupt circuit current and continues to provide auxiliary power to the trip unit to allow the trip unit microprocessor to display and record the shunt trip operation. A contact position indicating switch interacts with the circuit breaker operating mechanism to produce electrical indication to the trip unit as to the ON-OFF positions of the circuit breaker contacts.

DESCRIPTION OF THE PREFERRED EMBODIMENT

Figure 1:
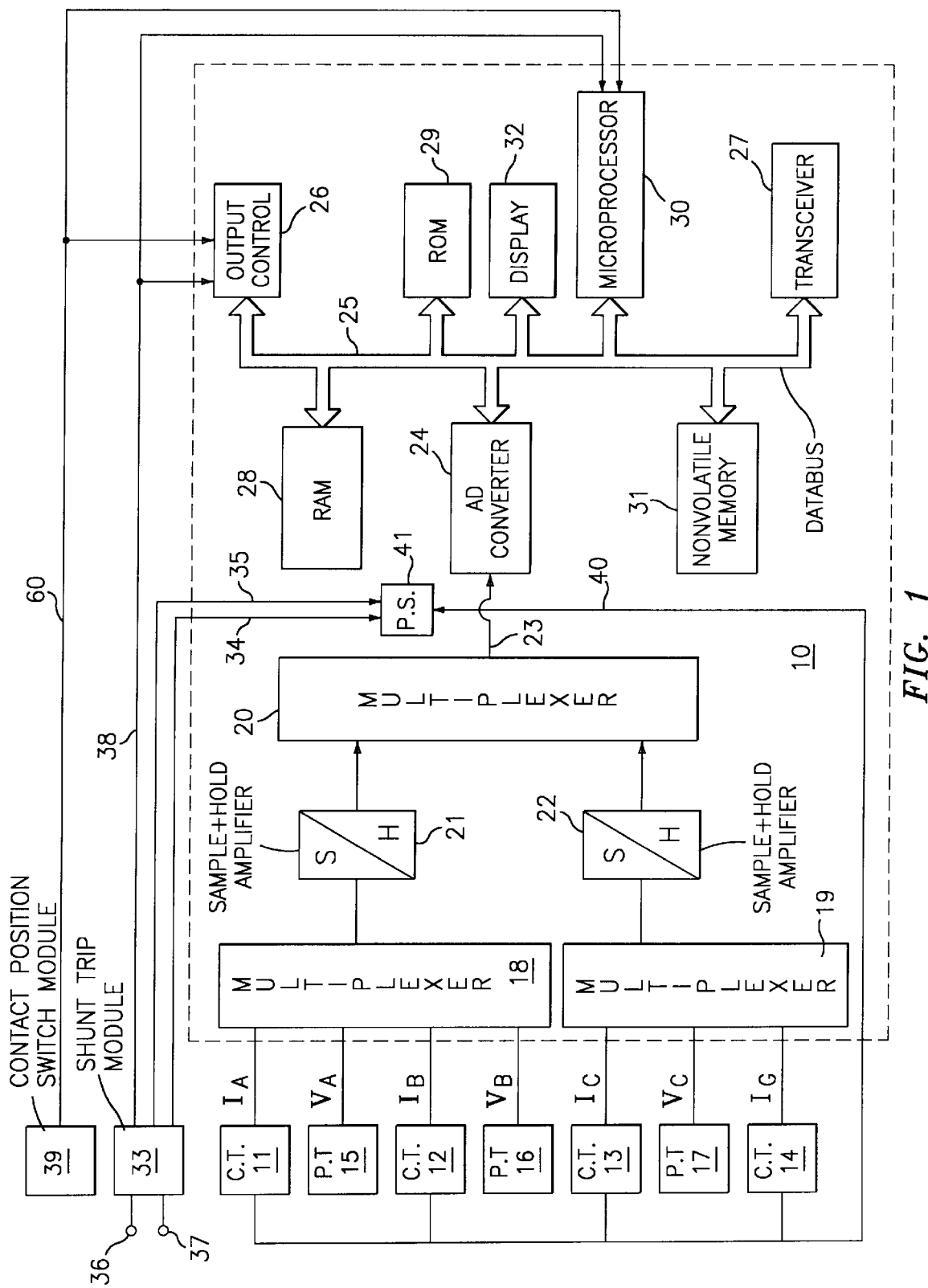
FIG. 1 is a schematic representation of a digital circuit interrupter that includes the shunt trip module according to the invention.

As described within the aforementioned U.S. Pat. No. 4,672,501, a circuit breaker trip unit 10 such as depicted in FIG. 1 to which external connection is made with current transformers 11–14 and potential transformers 15–17. The electrical input is transmitted through multiplexers 18–20 and sample and hold amplifiers 21, 22 to an A/D converter 24 by means of conductor 23. Circuit protection and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 32 that is similar to that described in U.S. Pat. No. 4,870,531 entitled "Circuit Breaker With Removable Display and Keypad". Operating power to the trip unit power supply 41 is provided by the current transformers 11–14 from the associated electrical distribution system over conductor 40 when the associated electrical distribution system is operational. In accordance with the invention, shunt trip facility is provided by connection of a shunt trip module 33 with the microprocessor 30 over conductor 38, and auxiliary power is provided by connection with the trip unit power supply 41 by means of conductors 34, 35. Auxiliary power is supplied to the output control 26 by means of conductors 38 and 60. For purposes of this disclosure, the term "shunt trip" is defined as the provision of a trip signal to the circuit breaker trip unit independent of the circuit breaker trip unit which otherwise determines a trip operation based on the occurrence of an overcurrent condition. The shunt trip signal is often supplied to the input terminals 36, 37 by an operator remote from the circuit breaker location to either test the circuit breaker operating components or to electrically disconnect the associated electrical equipment for replacement and repair. Upon the provision of a shunt trip signal, the circuit breaker trip unit is disconnected from the electrical distribution circuit and hence, becomes in-active. To maintain operating power to the trip unit, in accordance with the invention, operating power is supplied by the shunt trip module to the trip unit circuit by continued application of the shunt trip voltage signal, hereafter "STVS" over terminals 36, 37 to the power supply 41 after the associated electrical distribution circuit has been interrupted. The occurrence of the shunt trip interruption is transmitted to the microprocessor over conductor for storage and display. In order to indicate the status of the circuit breaker contacts, a contact position switch module 39 is connected with the trip unit microprocessor 30 over conductor 60. The operation of the contact position switch module 39 is described in U.S. patent application Docket No. 41PR-7407 filed Feb. 3, 1997 entitled "Circuit Breaker Contact Position Indicating Unit" wherein a microswitch interacts with the circuit breaker operating mechanism drive shaft to provide electrical indication of the ON-OFF status of the associated circuit breaker contacts. The microprocessor determines the status of the circuit breaker contacts before energizing the flux shifter unit contained within the circuit breaker operating mechanism to retain the flux shifter plunger as described in the aforementioned U.S. Pat. No. 4,672,501. If the circuit breaker contacts are in the ON position, the flux shifter solenoid is actuated to trip the circuit breaker.

Figure 2:
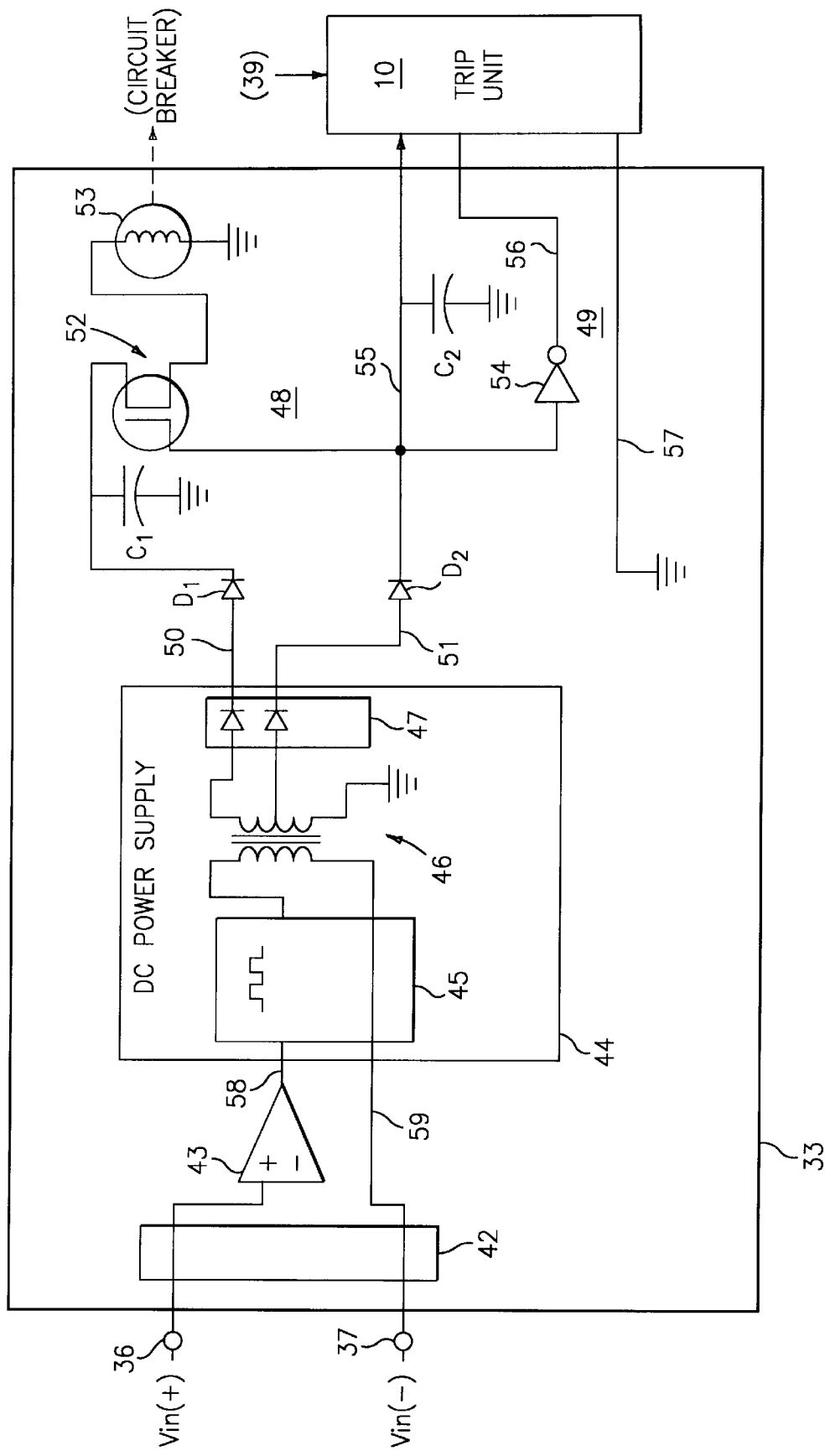
FIG. 2 is an enlarged diagrammatic representation of the components within the shunt trip module of FIG. 1.

The functional components of the shunt trip module 33 are depicted in FIG. 2 wherein the STVS supplied to input terminal 36 is inputted through a standard filter-surge compressor 42 to the comparator 43 for evaluation and thence over conductor 58 to a pulse generator 45 and one input to the isolation transformer 46 within the DC power supply 44. The function of the comparator is to insure that the STVS is an actual signal supplied by the operator and not a spurious voltage signal caused by a random electrical disturbance. The relevant electrical code requires that the STVS exceed fifty percent of the system voltage to insure that the STVS is intentional. The other input terminal 37 connects with the other input to the isolation transformer 46 over conductor 59, as indicated. The isolation transformer 46 connects through a pair of rectifying diodes 47, conductors 50, 51 and isolation diodes D1, D2 with a shunt trip solenoid control circuit 48 and with the trip unit 10. The shunt trip solenoid control arrangement is described in the aforementioned U.S. patent application Ser. No. 08/614,084. The shunt trip solenoid control circuit 48 provides an operating current signal to the shunt trip lockout solenoid in the following manner. The voltage signal is supplied over conductor to the drain of a FET 52 and to one side of a first power capacitor C1. The source of the FET connects with the shunt trip lockout solenoid 53 to interact with the circuit breaker operating mechanism. The gate of the FET 52 connects with the cathode of the isolation diode D2 via conductor 55 to control the ON-OFF state of the FET. The voltage signal is applied to the input of an inverter 54 and one side of a second capacitor C2 via conductor 55 within the trip unit power control circuit 49 to provide operating power to the trip unit over conductors 55, 56 for as long as the voltage signal is applied to the input terminals 36, 37 when the circuit breaker operating mechanism has responded to disconnect the trip unit from the associated electrical distribution system. When voltage is first applied to 36, 37, it causes the trip unit to be powered up and causes the circuit breaker to trip open. It also energizes the shunt trip lockout solenoid which interacts with the circuit breaker mechanism to prevent reclosure of the breaker. For as long as the voltage remains applied, the shunt trip lockout solenoid remains energized and thus intentionally prevent reclosure of the breaker. As described earlier, the ON and OFF states of the contacts within the circuit breaker are provided to the circuit breaker trip unit 10 by connection with the contact position switch module 39. Common ground connection between the shunt trip module 33 and the trip unit 10 is made by means of ground conductor 57.

Figure 3:
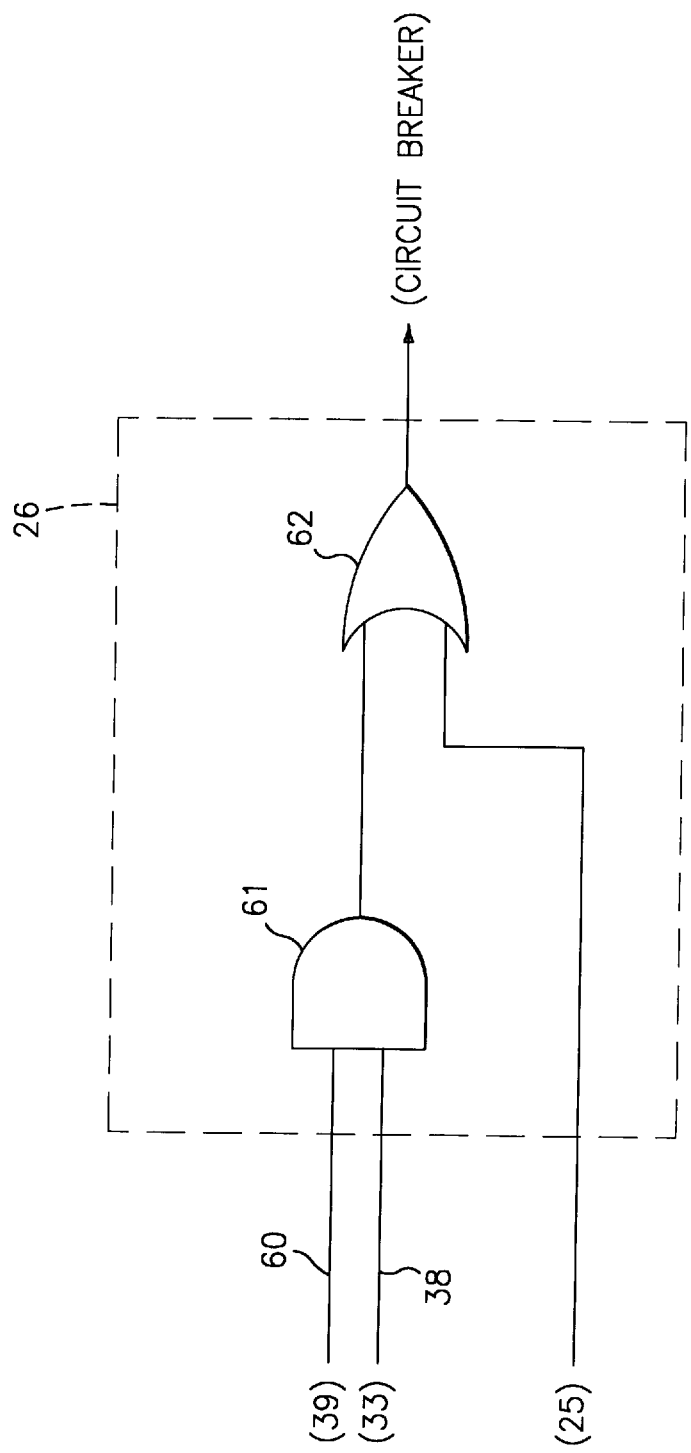
FIG. 3 is an enlarged diagrammatic representation of the circuit components within the output control module of FIG. 1.

The output control circuit 26 is shown in FIG. 3 to include an AND gate 61 to which input is provided from the contact position switch module 39 and from the shunt trip module 33 over conductors 60 and 38. The output of the AND gate is connected to one input of an OR gate 62 with the other input to the OR gate connected with the data bus 25 of FIG. 1. The output of the OR gate is connected with the circuit breaker operating mechanism flux shifter unit. In operation, the trip request output from the shunt trip module 33 and the signal from the contact position switch module 39 are first AND'ed together and then OR'd with protection and other trip requests from the trip unit data bus 25 to create the signal to drive the flux shifter. The flux shifter will not operate to separate the circuit breaker contacts until all the above conditions are met.

A shunt trip module has herein been described whereby the shunt trip signal supplied to circuit breaker flux shifter unit to separate the circuit breaker contacts and interrupt the associated electric circuit has herein been described. To prevent the circuit breaker operating mechanism from re-closing when the shunt trip remains energized and thus desired that the mechanism remain open, the shunt trip lockout solenoid remains energized and thus interlocks the mechanism and prevents re-closure of the breaker. Connection is made from a contact position switch to the trip unit to ensure that the trip unit only energizes the flux shifter to trip the breaker when the breaker is closed.

We claim:

1. An electronic trip unit having overcurrent and shunt trip circuit interruption facility comprising:

transformer means arranged for connection with an electrical distribution system;

a processor circuit connecting with said transformer means receiving sample current signals from said electrical distribution system to determine the occurrence of an overcurrent condition:

trip initiating means connecting with said processor circuit for interrupting current transfer through said electrical distribution system upon occurrence of said overcurrent condition;

power supply means within said processor circuit connecting with said transformer means and providing operational power to said processor circuit while said distribution system is uninterrupted;

a contact position circuit connecting with said processor circuit for determining ON and OFF conditions of an associated circuit breaker;

a shunt trip circuit connecting with said processor circuit and with input terminals, for receiving a voltage signal applied to said input terminals and outputting a trip command to said processor circuit to interrupt said electrical distribution system and to provide operational power to said processor circuit after said electrical distribution system becomes interrupted;

a comparator for outputting a control signal when said comparator has determined that said voltage signal exceeds a reference value; and a power supply circuit connecting with said comparator for receiving said control signal, said power supply circuit including a pulse generator, isolation transformer and a rectifier; wherein an output of the power supply circuit is supplied to a gate of a transistor switch connecting with a circuit breaker shunt trip solenoid.

2. The electronic trip unit of claim 1 wherein said transistor switch comprises a FET.

* * * * *